US012613749B2

(12) United States Patent
Shen et al.

(10) Patent No.: US 12,613,749 B2
(45) Date of Patent: Apr. 28, 2026

(54) METHODS AND SYSTEMS FOR DYNAMICALLY OPTIMIZING AND MODIFYING ALLOCATION OF VIRTUAL GRAPHICAL PROCESSING UNITS

(71) Applicant: Exostellar, Inc., Ithaca, NY (US)

(72) Inventors: Zhiming Shen, Sunnyvale, CA (US);
Henrique Fingler, Austin, TX (US);
Robert Wipfel, Draper, UT (US)

( * ) Notice: Subject to any disclaimer, the term of this patent is extended or adjusted under 35 U.S.C. 154(b) by 0 days.

(21) Appl. No.: 19/096,084

(22) Filed: Mar. 31, 2025

(65) Prior Publication Data

US 2025/0307017 A1      Oct. 2, 2025

Related U.S. Application Data

(60) Provisional application No. 63/572,833, filed on Apr. 1, 2024.

(51) Int. Cl.
*G06F 9/50* (2006.01)
*G06F 9/455* (2018.01)
*G06F 9/54* (2006.01)

(52) U.S. Cl.
CPC ........ *G06F 9/5044* (2013.01); *G06F 9/45558* (2013.01); *G06F 9/54* (2013.01);
(Continued)

(58) Field of Classification Search
None
See application file for complete search history.

(56) References Cited

U.S. PATENT DOCUMENTS 6,725,221 B2      4/2004   Murakami
7,512,769 B1      3/2009   Lowell
(Continued)

FOREIGN PATENT DOCUMENTS

CN          115943365 A      4/2023
IL               300200      3/2023
(Continued)

OTHER PUBLICATIONS

"DynamicXcelerator (DX Fabric)" Solution Brief by Drut, copyright 2023. (Year: 2023).*

(Continued)

*Primary Examiner* — Steven G Snyder
(74) *Attorney, Agent, or Firm* — Blueshift IP, LLC; Cynthia M. Gilbert

(57) ABSTRACT
A method for dynamically optimizing and modifying allocation of at least one disaggregated graphical processing unit (GPU) to at least one process via at least one virtual graphical processing units (vGPU) includes receiving, by a resource manager, from a runtime component executing on a first computing device, a request for allocation, to a process executing on the first computing device, of access to a GPU in the first computing device. The method includes allocating, by the resource manager, to the process, access to at least one vGPU associated with a second GPU on a second computing device. The method includes transmitting, by the resource manager, to the runtime component, an identification of the at least one vGPU identifying the at least one vGPU as located on the first computing device. The method includes instantiating, by the runtime component, the process with access to the at least one vGPU.

4 Claims, 7 Drawing Sheets

(52) U.S. Cl.
CPC .............. *G06F 2009/45595* (2013.01); *G06F 2209/544* (2013.01)

(56) References Cited

U.S. PATENT DOCUMENTS

| | | | | |
|---|---|---|---|---|
| 9,298,490 | B2 * | 3/2016 | Abiezzi ................. | G06F 9/5044 |
| 9,727,385 | B2 * | 8/2017 | Drebin ....................... | G06T 1/60 |
| 10,091,072 | B2 | 10/2018 | Cropper | |
| 10,120,728 | B2 * | 11/2018 | Drebin ...................... | G06T 1/20 |
| 11,145,271 | B2 * | 10/2021 | Wilt .......................... | G06T 1/20 |
| 11,321,068 | B2 * | 5/2022 | LePera ................. | G06F 9/5027 |
| 11,321,111 | B2 * | 5/2022 | de Lara ................. | G06F 9/5061 |
| 11,567,794 | B1 | 1/2023 | Emelyanov | |
| 11,637,773 | B2 * | 4/2023 | Noureddine ............ | H04L 45/66 370/396 |
| 11,886,926 | B1 | 1/2024 | Gadalin | |
| 12,099,884 | B2 | 9/2024 | An | |
| 12,254,342 | B2 * | 3/2025 | Bhandari ............ | G06F 9/45558 |
| 2007/0180436 | A1 | 8/2007 | Travostino | |
| 2013/0021353 | A1 * | 1/2013 | Drebin ...................... | G06T 1/60 345/522 |
| 2013/0023340 | A1 * | 1/2013 | Lee ....................... | A63F 13/355 463/30 |
| 2014/0139533 | A1 * | 5/2014 | Jan .......................... | G06F 15/76 345/520 |
| 2015/0220358 | A1 | 8/2015 | Ponsford | |
| 2016/0164762 | A1 | 6/2016 | Reque | |
| 2016/0217050 | A1 | 7/2016 | Grimm | |
| 2017/0047041 | A1 * | 2/2017 | Wilt ..................... | G06F 9/5077 |
| 2017/0098071 | A1 | 4/2017 | Stopel | |
| 2017/0329646 | A1 * | 11/2017 | Drebin ...................... | G06T 1/20 |
| 2018/0053001 | A1 | 2/2018 | Folco | |
| 2018/0074748 | A1 | 3/2018 | Makin | |
| 2018/0130171 | A1 * | 5/2018 | Prakash .................... | G06T 1/20 |
| 2018/0349204 | A1 * | 12/2018 | Liu ..................... | G06F 9/45558 |
| 2019/0050272 | A1 | 2/2019 | Liu | |
| 2019/0250946 | A1 | 8/2019 | Parameshwaran | |
| 2019/0278624 | A1 | 9/2019 | Bade | |
| 2019/0347127 | A1 | 11/2019 | Coady | |
| 2020/0034167 | A1 | 1/2020 | Parthasarathy | |
| 2020/0065021 | A1 | 2/2020 | Mayatskikh | |
| 2020/0097323 | A1 | 3/2020 | Nider | |
| 2020/0117743 | A1 | 4/2020 | Shilimkar | |
| 2020/0192689 | A1 | 6/2020 | Smith, IV | |
| 2020/0310853 | A1 | 10/2020 | Featonby | |
| 2020/0356397 | A1 | 11/2020 | Kumatagi | |
| 2021/0011751 | A1 * | 1/2021 | Garg ..................... | G06F 9/5044 |
| 2021/0026707 | A1 | 1/2021 | Rosenberg | |
| 2021/0109775 | A1 | 4/2021 | Shen | |
| 2021/0208951 | A1 * | 7/2021 | He ............................ | G06T 1/20 |
| 2021/0250285 | A1 * | 8/2021 | Noureddine ...... | H04L 12/40013 |
| 2021/0318900 | A1 | 10/2021 | Gopalan | |
| 2022/0027778 | A1 | 1/2022 | Kochura | |
| 2022/0050705 | A1 | 2/2022 | Shen | |
| 2022/0084157 | A1 | 3/2022 | Wang | |
| 2023/0024130 | A1 * | 1/2023 | Acharya ............... | G06F 1/3228 |
| 2023/0105439 | A1 | 4/2023 | Shen | |
| 2023/0224247 | A1 * | 7/2023 | Noureddine ............ | H04L 63/20 370/257 |
| 2023/0236861 | A1 | 7/2023 | Sahu | |
| 2023/0393879 | A1 | 12/2023 | Olmsted-Thompson | |
| 2024/0143378 | A1 | 5/2024 | Shen | |
| 2024/0143448 | A1 | 5/2024 | Kim | |
| 2024/0176643 | A1 * | 5/2024 | Bhandari ............ | G06F 9/45558 |
| 2024/0272942 | A1 | 8/2024 | Peng | |
| 2024/0345875 | A1 * | 10/2024 | Zad Tootaghaj ...... | G06F 9/4856 |
| 2024/0370291 | A1 | 11/2024 | Liu | |
| 2025/0021369 | A1 | 1/2025 | Parekh | |
| 2025/0086510 | A1 * | 3/2025 | McBride ............... | G06F 9/5027 |
| 2025/0258720 | A1 * | 8/2025 | Shen .................... | G06F 9/5088 |

FOREIGN PATENT DOCUMENTS

| | | | | |
|---|---|---|---|---|
| WO | WO-2017083781 | A1 * | 5/2017 | ............ G06F 9/445 |
| WO | 2022040082 | A1 | 2/2022 | |

OTHER PUBLICATIONS

'RCUDA: Reducing the Number of GPU-Based Accelerators in High Performance Clusters' by Jose Duato et al., copyright 2010. (Year: 2010).*

'GVMP: A multi-objective joint VM and vGPU placement heuristic for API remoting-based GPU virtualization and disaggregation in cloud data centers' by Ahmad Siavashi et al., Sep. 28, 2022. (Year: 2022).*

'Sharing GPUs in Machine Learning Environments' Technical White Paper from VMWare, May 2020. (Year: 2020).*

'VMware vSphere Bitfusion Performance Best Practices Guide' from VMWare, Jul. 14, 2020. (Year: 2020).*

'GScale: Scaling up GPU Virtualization with Dynamic Sharing of Graphics Memory Space' by Mochi Xue et al, 2016 USENIX Annual Technical Conference. (Year: 2016).*

Machine Translation of Chinese Patent Application CN 115686839 A, Feb. 3, 2023. (Year: 2023).*

Machine Translation of WIPO Publication WO 2021098182 A1, May 27, 2021. (Year: 2021).*

Machine Translation of WIPO Publication WO 2024032587 A1, Feb. 15, 2024. (Year: 2024).*

Cloud Management Platform Market Size ,Overview and scope, Market players, Market Research, Growth During to 2017- 2024, Press Release MarketWatch News Department, May 7, 2019. (Accessed Feb. 17, 2020, at https://www.marketwatch.com/press-release/cloud-mana players-market-research-growth-during-to-2017--2024-2020-05-07?mod=mw_quote_news.

Gartner Forecasts Worldwide Public Cloud Revenue to Grow 17.3 Percent in 2019, Press Release, Stamford, Connecticut, USA, Sep. 12, 2018 (Accessed Feb. 17, 2020, at https://www.gartner.com/en/newsroom/press-releases/2018-09-12-gartner-forecasts-worldwide-public-cloud-revenue-to-grow-17-percent-in-2019.).

Andreas Fischer et al: "Wide-Area Virtual Machine Migration as Resilience Mechanism", Reliable Distributed Systems Workshops (SRDSW), 2011 30th IEEE Symposium on, IEEE, Oct. 4, 2011 (Oct. 4, 2011), pp. 72-77, XP032022027, DOI: 10.1109/SRDSW. 2011.16 ISBN: 978-1-4577-1624-9.

Christine Parizo "Managing multiple clouds requires careful choice, architecture planning," TechRepublic, Nov. 2016. Accessed Feb. 17, 2020, at https://www.techrepublic.com/article/managing-multiple-clouds-requires-carefulchoice-architectu re-planning/).

Dan Williams et al., "The Xen-Blanket: Virtualize Once, Run Everywhere," EuroSys '12: Proceedings of the 7th ACM European conference on Computer Systems, Bern, Switzerland, Apr. 2012, pp. 113-126.

Daniel Hein, "Cloud Users Are Wasting 35% of Their Cloud Spending," Cloud Computing News 2019. (Accessed Feb. 17, 2020, at https://solutionsreview.com/cloud-platforms/cloud-users-are-wasting-35-of-their-cloud-spending/.).

Extended European Search Report issued in App. No. EP21858893, dated Sep. 25, 2024, 13 pages.

International Search Report and Written Opinion issued in App. No. PCT/US2025/15209, dated May 23, 2025, 10 pages.

International Search Report and Written Opinion mailed Dec. 9, 2021, in international patent application No. PCT/US2021/046133, 6 pages.

Jay Chapel, "4 Types of Idle Cloud Resources That Are Wasting Your Money," Technology & Innovation: Cloud Computing, Jun. 26, 2018. (Accessed Feb. 17, 2020, at https://www.business2community.com/cloud-computing/4-types-of-idle-cloud-resources-that-arewasting-your-money-02082628).

Jay Chapel, "Cloud Waste to Hit Over $14 Billion in 2019," DevOps, 2019. (Accessed Feb. 17, 2020, at https://devops.com/cloud-waste-to-hit-over-14-billion-in-2019/).

Larry Dignan, "Top cloud providers in 2020: AWS, Microsoft Azure, and Google Cloud, hybrid, SaaS players," Part of a ZDNet Special Feature: Managing the Multicloud, 2020,48 pages. (Accessed Feb. 17, 2020, at https://www.zdnet com/article/the-top-cloud-providers-of-2020-aws-microsoft-azure-google-cloud-hybrid-saas/).

(56) References Cited

OTHER PUBLICATIONS

Laurence Goasduff, "Why Organizations Choose a Multicloud Strategy," Gartner.com, May 2019. at https://www.gartner.com/smarterwithgartner/why-organizations-choose-a-multicloud-strategy/.

Mary Shacklett, "Enterprise leader's guide to building a successful multicloud strategy," Part of a ZDNet Special Feature: Managing the Multicloud, Jul. 1, 2019. (Accessed Feb. 17, 2020, at https://www.zdnet.com/article/enterprise-leaders-guide-to-building-a-successful-multicloudstrategy/).

Michele Mazzucco et al., "Achieving Performance and Availability Guarantees with Spot Instances," 2011 IEEE International Conference on High Performance Computing and Communications, Banff, AB, Canada, Sep. 2-4, 2011, 8 pages.

Navraj Chohan et al., "See Spot Run: Using Spot Instances for MapReduce Workflows," HotCloud'10: Proceedings of the 2nd USENIX conference on Hot topics in cloud computing, Jun. 2010, 7 pages.

Notice of Allowance dated May 8, 2025 for U.S. Appl. No. 19/049,229 (pp. 1-18).

Notice of Allowance dated May 28, 2025 for U.S. Appl. No. 19/049,229 (pp. 1-13).

Notice of Allowance issued in App. No. IL300200, dated Oct. 24, 2023, 3 pages.

Office Action (Final Rejection) dated Apr. 14, 2025 for U.S. Appl. No. 18/410,938 (pp. 1-6).

Office Action (Non-Final Rejection) dated Feb. 4, 2025 for U.S. Appl. No. 18/079,392 (pp. 1-12).

Office Action (Non-Final Rejection) dated Sep. 23, 2024 for U.S. Appl. No. 18/410,938 (pp. 1-9).

Office Action (Notice of Allowance and Fees Due (PTOL-85)) dated Oct. 12, 2023 for U.S. Appl. No. 17/403,326 (pp. 1-8).

Prateek Sharma et al., "SpotCheck: Designing a Derivative IaaS Cloud on the Spot Market," EuroSys '15 (2015) 15 pages.

Qin Jia et al., "Smart Spot Instances for the Supercloud," CrossCloud '16: Proceedings of the 3rd Workshop on CrossCloud Infrastructures & Platforms, London, United Kingdom, Apr. 2016, Article No. 5, pp. 1-6.

Rightscale 2019 State of the Cloud Report from Flexera: As Cloud use grows, organizations focus on Cloud costs and governance, Press Release by Flexera, 2019, 50 pages. Available online at <<https://resources.flexera.com/web/media/documents/rightscale-2019-state-of-the-cloud-report-from-flexera.pdfB.

Ron Miller, VMware acquires Cloud Health Technologies for multi-cloud management, TechCrunch, Aug. 27, 2018. (Accessed Feb. 26, 2020, at https://techcrunch.com/2018/08/27/vmware-acquires-cloudhealth-technologies-for-Multi-cloud-management).

Sangho Yi et al., "Reducing Costs of Spot Instances via Checkpointing in the Amazon Elastic Compute Cloud," 2010 IEEE 3rd International Conference on Cloud Computing, Miami, FL, Jul. 5-10, 2010, pp. 236-243.

Supreeth Shastri et al., "Cloud Index Tracking: Enabling Predictable Costs in Cloud Spot Markets," SoCC '18: Proceedings of the ACM Symposium on Cloud Computing, Carlsbad, CA, USA, Oct. 11-13, 2018, pp. 451-463. Available online at: <<https://doi.org/10.1145/3267809.3267821>>.

Supreeth Shastri et al., "HotSpot: Automated Server Hopping in Cloud Spot Markets," SoCC '17: Proceedings of the 2017 Symposium on Cloud Computing, Santa Clara, California, US, Sep. 2017, pp. 493-505.

Supreeth Subramanya et al., "SpotOn: A Batch Computing Service for the Spot Market," SoCC '15: Proceedings of the Sixth ACM Symposium on Cloud Computing, Kohala Coast, Hawaii, USA, Aug. 2015 pp. 329-341.

Taifi, "Banking on Decoupling: Budget-driven Sustainability for HPC Applications on Auction-based Clouds," ACM SIGOPS Operating Systems Review, vol. 47, No. 2, 2012, pp. 41-50.

Tay, Y. C. et al: "A Performance Comparison of Containers and Virtual Machines in Workload Migration Context", 2017 IEEE 37th International Conference on Distributed Computing Systems Workshops (ICDCSW), IEEE, Jun. 5, 2017 (Jun. 5, 2017), pp. 61-66, XP033122904, DOI: 10.1109/ICDCSW.2017.44 [retrieved on Jul. 13, 2017].

Timothy Wood et al, "Black-box and Gray-box Strategies for Virtual Machine Migration," NSDI '07,4th Usenix Symposium on Networked Systems Design & Implementation, Apr. 11-13, 2007, Cambridge, Massachusetts, USA, 14 )ages.

Zhiming Shen et al., "Follow the Sun through the Clouds: Application Migration for Geographically Shifting Workloads," 3oCC '16: Proceedings of the Seventh ACM Symposium on Cloud Computing, Oct. 2016, pp. 141-154.

Zhiming Shen et al., "X-Containers: Breaking Down Barriers to Improve Performance and Isolation of Cloud-Native Containers," ASPLOS '19: Proceedings of the Twenty-Fourth International Conference on Architectural Support for Programming Languages and Operating Systems, Providence, Rhode Island, USA, Apr. 13-17, 2019, pp. 121-135.

Office Action (Notice of Allowance and Fees Due (PTOL-85)) dated Aug. 5, 2025 for U.S. Appl. No. 18/410,938 (pp. 1-5).

Office Action (Notice of Allowance and Fees Due (PTOL-85)) dated Aug. 26, 2025 for U.S. Appl. No. 18/410,938 (pp. 1-2).

Office Action (Notice of Allowance and Fees Due (PTOL-85)) dated Aug. 28, 2025 for U.S. Appl. No. 18/079,392 (pp. 1-9).

Office Action (Notice of Allowance and Fees Due (PTOL-85)) dated Sep. 15, 2025 for U.S. Appl. No. 19/049,229 (pp. 1-7).

Office Action (Notice of Allowance and Fees Due (PTOL-85)) dated Nov. 12, 2025 for U.S. Appl. No. 19/049,229 (pp. 1-2).

Office Action (Notice of Allowance and Fees Due (PTOL-85)) dated Nov. 14, 2025 for U.S. Appl. No. 18/410,938 (pp. 1-2).

Office Action (Notice of Allowance and Fees Due (PTOL-85)) dated Nov. 25, 2025 for U.S. Appl. No. 18/079,392 (pp. 1-2).

* cited by examiner

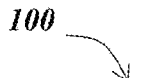
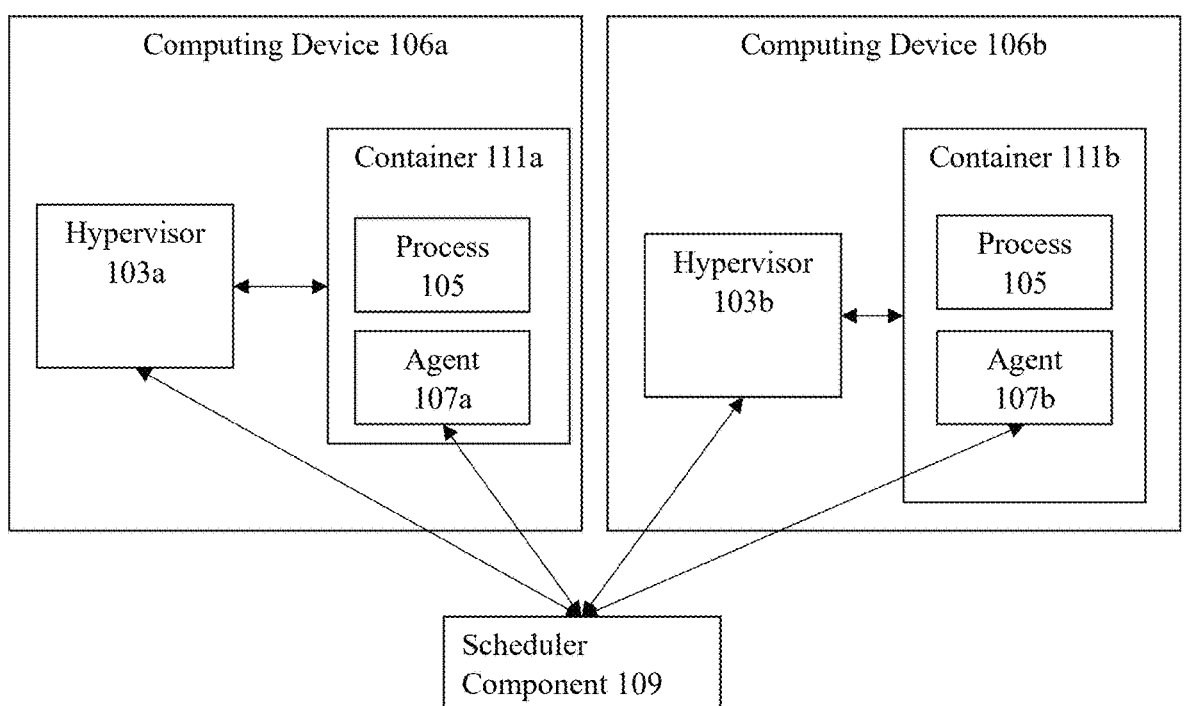
*Fig. 1A*

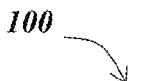
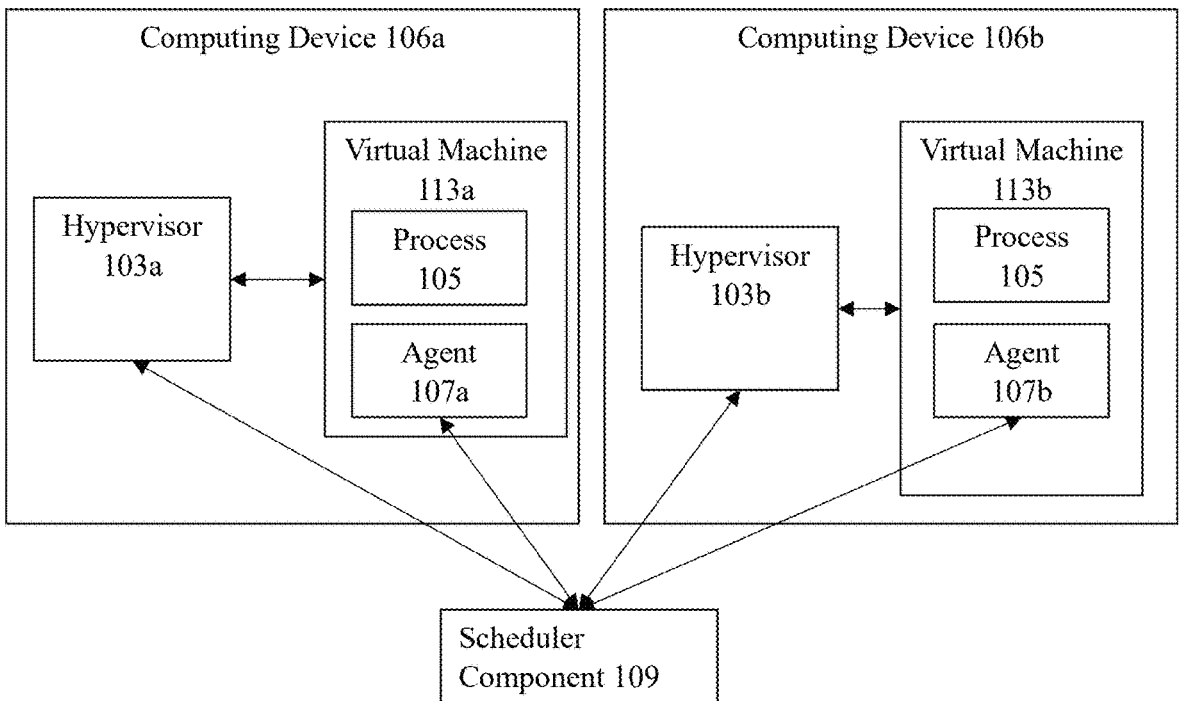
*Fig. 1B*

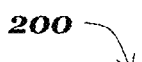

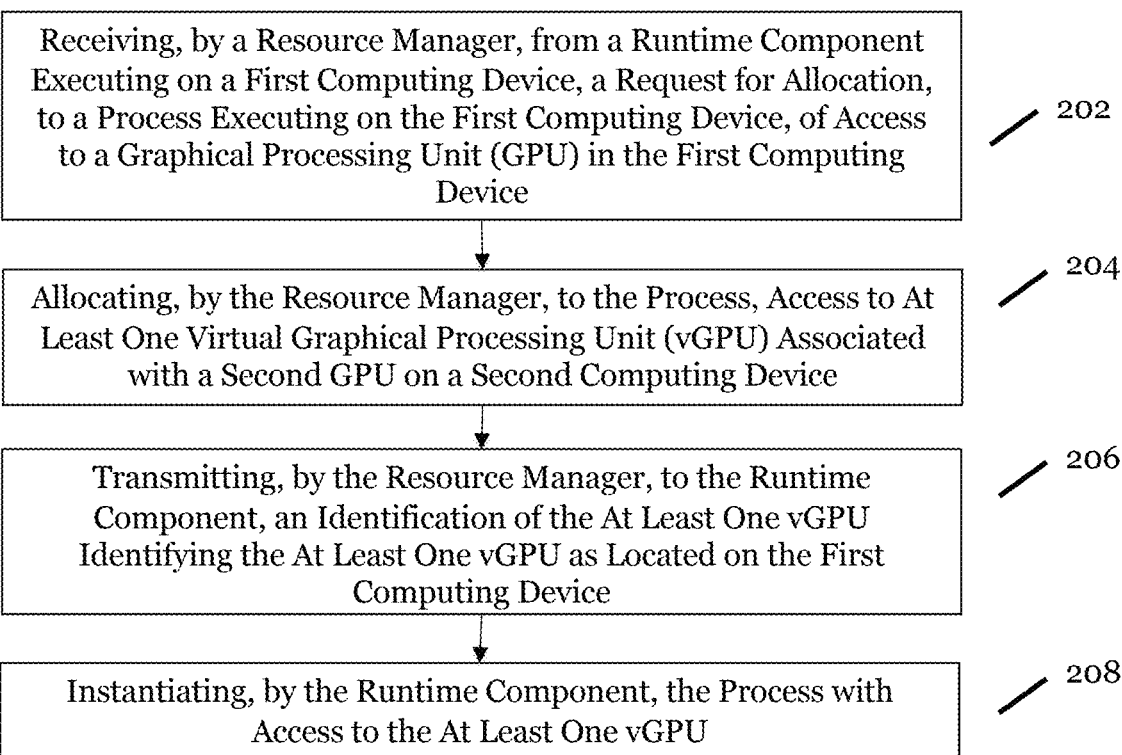

200

Receiving, by a Resource Manager, from a Runtime Component Executing on a First Computing Device, a Request for Allocation, to a Process Executing on the First Computing Device, of Access to a Graphical Processing Unit (GPU) in the First Computing Device — 202

Allocating, by the Resource Manager, to the Process, Access to At Least One Virtual Graphical Processing Unit (vGPU) Associated with a Second GPU on a Second Computing Device — 204

Transmitting, by the Resource Manager, to the Runtime Component, an Identification of the At Least One vGPU Identifying the At Least One vGPU as Located on the First Computing Device — 206

Instantiating, by the Runtime Component, the Process with Access to the At Least One vGPU — 208

*Fig. 2*

METHODS AND SYSTEMS FOR DYNAMICALLY OPTIMIZING AND MODIFYING ALLOCATION OF VIRTUAL GRAPHICAL PROCESSING UNITS

CROSS-REFERENCE TO RELATED APPLICATIONS

This application claims priority to U.S. Provisional Patent Application 63/572,833, filed on Apr. 1, 2024, entitled, "Methods and Systems for Dynamically Optimizing and Modifying Allocation of Virtual Graphical Processing Units," which is hereby incorporated by reference.

BACKGROUND

The disclosure relates to methods for dynamically optimizing and modifying resource allocations. More particularly, the methods and systems described herein relate to functionality for dynamically optimizing and modifying allocation of virtual graphical processing units to processes.

Conventionally, due to the many dependencies of an executing process to an underlying operating system, it is difficult, if not impossible, to migrate a process while the process executes. As a result, when a system allocates a virtual resource to a process such as a containerized process or a process executing in a virtual machine, conventional systems typically over-allocate virtualized resources to minimize the likelihood of a process needing more resources than are available. Additionally, such conventional systems typically do not modify an amount of a virtual resource allocated to a process during execution of the process, even after the process has begun executing and demonstrates utilization of less than all of the allocated virtual resource. Such over-allocations and failures to adapt to resource utilization during process execution result in inefficient use of resources and artificial, possibly unnecessary, constraints.

With the rise of Machine Learning (ML) and Generative Artificial Intelligence (GenAI), there is a growing prevalence of GPU-intensive workloads. For example, deep learning models such as convolutional neural networks (CNNs) for image recognition, recurrent neural networks (RNNs) for natural language processing, and reinforcement learning for robotics heavily rely on GPU acceleration for training and inference. Additionally, research in generative adversarial networks (GANs) and transformer-based architectures, like BERT and GPT, necessitate significant GPU resources. Many organizations have made substantial investments in GPU hardware to support these applications. However, they often face the challenge of underutilization of these crucial resources. This underutilization arises from a lack of effective sharing and allocation mechanisms that can dynamically match available GPU resources to the ever-changing demands of various departments or projects. Such inefficiencies can notably slow down research projects or product development cycles, potentially resulting in missed opportunities or delayed market entry. While some teams might be constrained by GPU resource shortages, others might be dealing with idle GPU capacities. This dichotomy not only hampers optimal performance but also diminishes the return on GPU investments. The current landscape underscores the pressing need for a solution that ensures maximum GPU utilization through the seamless sharing and dynamic allocation of GPU resources across different teams and projects.

BRIEF SUMMARY

In one aspect, a method for dynamically optimizing and modifying allocation of at least one disaggregated graphical processing unit (GPU) to at least one process via at least one virtual graphical processing units (vGPU) includes receiving, by a resource manager, from a runtime component executing on a first computing device, a request for allocation, to a process executing on the first computing device, of access to a GPU in the first computing device. The method includes allocating, by the resource manager, to the process, access to at least one vGPU associated with a second GPU on a second computing device. The method includes transmitting, by the resource manager, to the runtime component, an identification of the at least one vGPU identifying the at least one vGPU as located on the first computing device. The method includes instantiating, by the runtime component, the process with access to the at least one vGPU.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 1A is a block diagram depicting an embodiment of a system for dynamically optimizing and modifying allocation of virtual resources to containerized processes;

FIG. 1B is a block diagram depicting an embodiment of a system for dynamically optimizing and modifying allocation of virtual resources to processes executing in virtual machines;

FIG. 2 is a flow diagram depicting an embodiment of a method for dynamically optimizing and modifying allocation of virtual graphical processing units to processes.

DETAILED DESCRIPTION

Figure 1C:
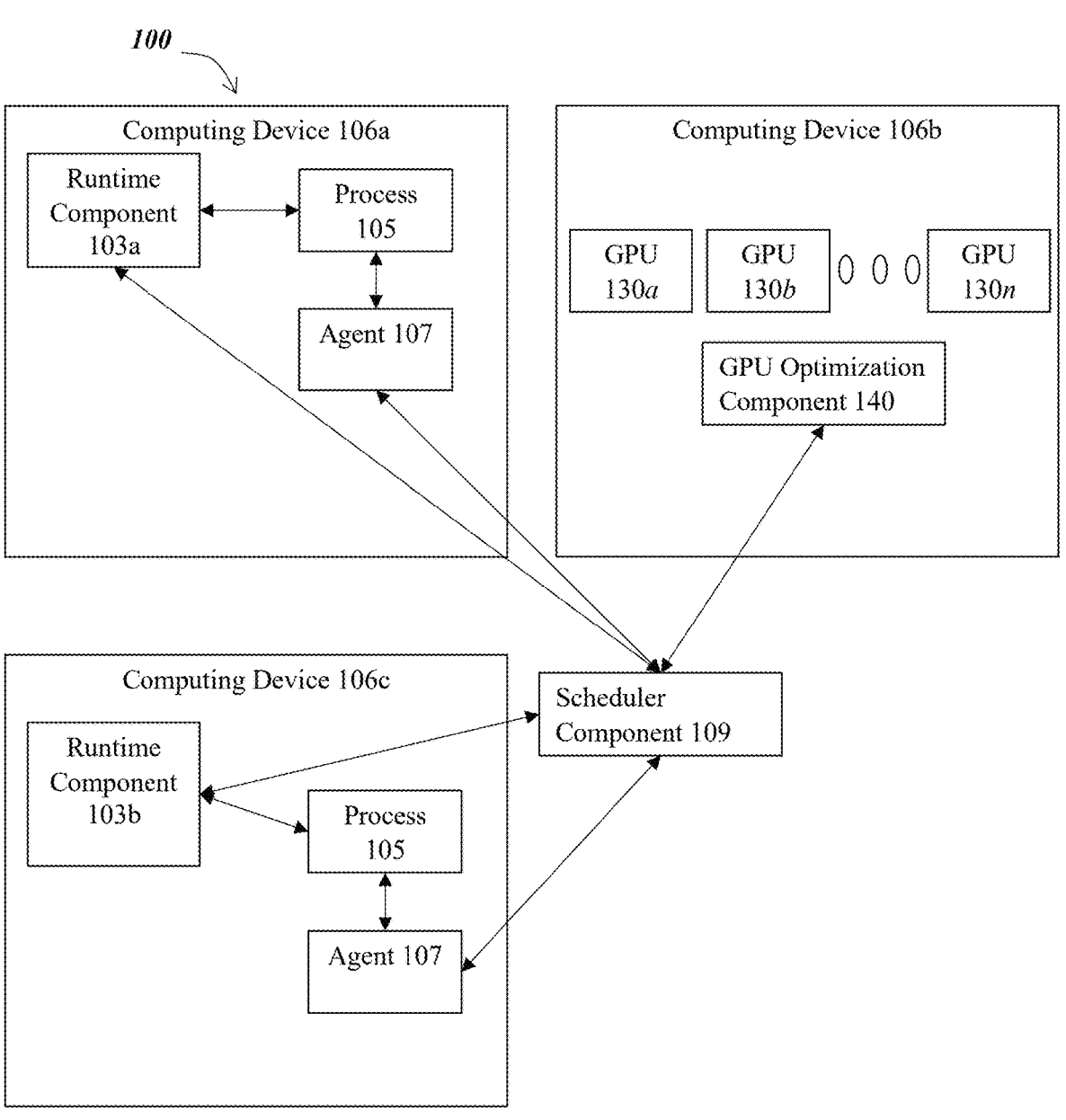
FIG. 1C is a block diagram depicting an embodiment of a system for dynamically optimizing and modifying allocation of virtual graphical processing units to processes.

The methods and systems described herein may provide functionality for dynamically optimizing and modifying allocation of virtual resources, including graphical processing units, to processes executing in virtual machines.

Referring now to FIG. 1A, a block diagram depicts one embodiment of a system for dynamically optimizing and modifying allocation of virtual resources to processes executing in virtual machines. In brief overview, the system 100 includes a first computing device 106a and a second computing device 106b, a scheduler component 109, hypervisors 103a-b, containers 111a-b, a process 105, and agents 107a-b. The computing devices 106a-b may be a modified type or form of computing device (as described in greater detail below in connection with FIGS. 3A-3C) that have been modified to execute instructions for providing the functionality described herein; these modifications result in a new type of computing device that provides a technical solution to problems rooted in computer technology, such as modification of resources allocated to, and migration of, executing processes.

The computing devices 106a and 106b may include functionality for instantiating a container image as a containerized process. As will be understood by those of skill in the art, conventional containers (and their associated container images) share a host computing device's kernel to run an application (or other process) within the container; the conventional container typically includes only binaries, libraries, and runtime components—the isolation may be considered to be process-level isolation. The methods and systems described herein may provide functionality for instantiating and migrating executing containerized processes that execute in this way. The methods and systems described herein may provide functionality for instantiating and migrating executing containerized processes that dedicated operating system kernels as well. The methods and systems described herein may provide functionality for supporting an operating system kernel that can be directly mapped into an address space of the containerized process. The methods and systems described herein may provide functionality for supporting an operating system kernel that can run separately in its own address space for isolation.

The system 100 may optionally include a container engine (not shown) that may provide functionality for receiving instructions to instantiate container images and directing the instantiation of the container image, resulting in a container 111. The container image may be a container image that includes a dedicated kernel. The container image may be a container image that includes a dedicated kernel executing as a library in user mode. The container image may be a container image that does not include a dedicated kernel.

The hypervisors 103*a-b* may be provided as software components. The hypervisors 103*a-b* may be provided as hardware components. The computing device 106*a-b* may execute the hypervisors 103*a-b*.

The computing device 106*a* may execute the container 111*a*, which in turn executes the process 105. The computing device 106*b* may execute the container 111*b*, which may execute the process 105 after migration of the process 105 from the computing device 106*a* to the computing device 106*b*.

The agents 107*a-b* may be provided as software components. The agents 107*a-b* may be provided as hardware components. The agents 107*a-b* may execute in a user space of the containers 111*a-b*.

The container 111*a* may execute the agent 107*a*. The container 111*b* may execute the agent 107*b*.

The system 100 may include a scheduler component 109. The scheduler component 109 may execute on a third computing device 106*c* (not shown). The scheduler component 109 may be in communication with the computing devices 106*a-b*. The scheduler component 109 may be in communication with the hypervisors 103*a-b*. The scheduler component 109 may be in communication with the agents 107*a-b*. The scheduler component 109 may include functionality for communicating with an optional container engine. The scheduler component 109 may provide functionality for managing migrations. The scheduler component 109 may monitor a status of the system 100. The scheduler component 109 may trigger process migrations based on one or more policies. Policies may include, by way of example, policies for optimizing cost, minimizing latency, or increasing availability. The scheduler component 109 may trigger process migrations based on data received from the agents 107*a-b* regarding a level of resource utilization consumed by one or more processes 105.

The container 111*a* may execute the process 105. The container 111*b* may execute the execute the process 105 after migration of the process 105 from the computing device 106*a* to the computing device 106*b*. The process 105 may be any type or form of executable computer program. The process 105 may be referred to as a containerized process 105 when the process 105 executes within a container. Referring now to FIG. 1B, in some embodiments the system 100 executes one or more virtual machines 113*a-b* instead of or in addition to containers 111*a-b*. In such embodiments, the process 105 is an application executed within a virtual machine 113*a-b* instead of a containerized process.

Although, for ease of discussion, components are described in FIGS. 1A-1B as separate modules, it should be understood that this does not restrict the architecture to a particular implementation. For instance, these components may be encompassed by a single circuit or software function or, alternatively, distributed across a plurality of computing devices.

The system 100 may execute one or more methods for allocating physical and/or virtual resources to one or more processes, which themselves may execute directly on physical hardware or indirectly via virtual resources (e.g., by executing in a container or virtual machine). The system 100 may execute functionality for determining, by an agent executing in a user space of the container image and in communication with a resource allocation process executing in the user space of the container image, an amount of a virtual resource to be utilized by the at least one containerized process, which may or may not be the same as the amount requested either by the process or by a runtime component instantiating the process and providing the process with access to required resources. For example, the agent 107*a* may access a file that logs utilization data (e.g., of memory or CPU or other resources) or other data identifying an amount allocated by the hypervisor 103*a* to the process 105 (and/or to the container 111*a*) and the agent 107*a* may then use the accessed data to determine an amount of utilization of a virtual resource by the process 105 compared to an amount of allocation of the virtual resource. The agent 107*a* may communicate that determined amount to the scheduler component 109, which may determine to modify the amount of the virtual resource allocated to the process 105—without indicating to the process 105 that the modification has occurred.

As the containerized process 105 executes, the agent 107*a* may monitor the process' utilization of the first virtual resource. The agent 107*a* may compare a first level of utilization of the first virtual resource by the process with a second level of utilization of the first virtual resource by a different process—for example, by the process 105 at a different time or by a different process having a similar or same type as the process 105. For example, the agent 107*a* may determine, without limitation, that the process 105 is executing during a session by a user of the computing device 106*a* and identify a previously logged time during which the process 105 executed during a previous session by the user and may compare the current level of utilization of the first resource with the level of utilization during the previous session. As another example, the agent 107*a* may determine, without limitation, that the process 105 is a type of application—such as a word processing application or a computer aided design application or a communications application or any other type of application—and may access and review utilization logs of other processes having substantially the same type and then compare the current level of utilization with a level of utilization logged during execution of the other process of the same or substantially the same type. As a further example, the agent 107*a* may include or be in communication with a machine learning engine (not shown), which may take as input metadata associated with the process 105 (including, for example, and without limitation, process name, process type, user data, computing device 106 data, etc.) and generate a prediction of a level of utilization that the process 105 will require during the current execution of the process 105. In some embodiments, the agent 107a may receive user input from a user of the computing device 106a providing additional information for use in determining the level of utilization of the first virtual resource during the current execution of the process 105 (e.g., via user input and/or ad hoc requests).

The agent 107a may be in communication with a resource allocation process (not shown) executing in the user space of the container image. The resource allocation process may be a balloon driver. The resource allocation process may transmit resource utilization requests to the hypervisor 103a. The resource allocation process may include functionality for modifying an allocation of a virtual resource made by the hypervisor for the process 105. However, unlike conventional processes such as balloon drivers, the resource allocation process may be configured to enable more than one modification to an allocation. Furthermore, and unlike conventional processes such as balloon drivers, the resource allocation process may be configured to enable delayed allocation of virtual resources. For example, the hypervisor 103a may inform the virtual machine 113a and/or the process 105 that the hypervisor 103a has allocated a certain amount of a virtual resource; the resource allocation process however may direct the hypervisor 103a to allocate less than that amount of the virtual resource without the process 105 receiving an indication of how much of the virtual resource is actually allocated—when the process 105 utilizes the amount actually allocated the resource allocation process may then direct the hypervisor 103a to allocate an additional amount of the virtual resource up to the total amount initially allocated by the hypervisor 103a. The agent 107a may transmit an identifier of the determined second amount to the scheduler component 109 for allocation.

In some embodiments, for example embodiments for optimizing infrastructure for workloads relating to machine learning or artificial intelligence (ML/AI), the systems described herein may disaggregate resources, such as central processing units (CPUs) and/or graphical processing units (GPUs), into separate pools. Processes that require GPU resources may request access to a physical GPU and receive an indication that they are receiving access to a physical GPU but are actually assigned access to one or more virtual GPUs (vGPUs), which may be dynamically linked to physical GPUs, for example, in a shared GPU pool. This is in contrast to the approach taken by conventional solutions for traditional computing clusters where CPU resources and GPU resources are typically tightly coupled in each node, which results in rigidity in resource allocation (as both CPU and GPU capacities of a node are consumed in tandem, even if a particular workload might be predominantly CPU-bound or GPU-bound); such a model may lead to inefficiencies and underutilization of either the CPU or the GPU, especially in systems processing a plurality of diverse ML/AI workloads.

As an example of the system described herein for disaggregated vGPUs, FIG. 1C is a block diagram depicting one embodiment of a GPU optimizer component in the system 100. In brief overview, one or more processes 105 (which may execute in a sandbox, virtual machine, or container, or which may execute directly on the physical hardware of a particular computing device 106), are instantiated by a runtime component 103, which allocates one or more resources to each process 105. A scheduler component 109 is in communication with the runtime component 103 and with an agent 107, which itself may also be in communication with the process 105.

As indicated above, the agent 107 may gather data associated with resource utilization by the process 105 for use in determining what resource or resources the components of the system 100 should allocate to the process 105. The agent 107 may execute a component for interfacing with the process 105, which may be a machine learning engine; in such an embodiment, the agent 107 may execute or be in communication with an interface to a framework for executing machine learning interfaces, such as PYTORCH or TENSORFLOW.

A computing device 106b may host one or more physical GPUs 130a-130n, which are available to one or more processes on one or more computing devices 106. By generating a virtual version of the graphical processing unit, the system 100 may provide the process 105 with the illusion that it has access to a local GPU although it is actually accessing a remotely located, disaggregated GPU. The system 100 may include a GPU optimization component 140 that generates a vGPU definition for each physical GPU available. The GPU optimization component 140 may generate and maintain a schedule of availability for each physical GPU available.

The scheduler component 109 may include functionality for enabling remote and/or dynamic binding of a vGPU to a process 105. The scheduler component 109 may include functionality for requesting from, for example, by a GPU optimization component 140, the creation of a vGPU based on a physical GPU.

Referring now to FIG. 2, and in connection with FIGS. 1A, 1B, and 1C, a method 200 depicts one embodiment of a method for dynamically optimizing and modifying allocation of at least one disaggregated graphical processing unit (GPU) to at least one process via at least one virtual graphical processing units (vGPU). In brief overview, the method 200 includes receiving, by a resource manager, from a runtime component executing on a first computing device, a request for allocation, to a process executing on the first computing device, of access to a GPU in the first computing device (202). The method 200 includes allocating, by the resource manager, to the process, access to at least one vGPU associated with a second GPU on a second computing device (204). The method 200 includes transmitting, by the resource manager, to the runtime component, an identification of the at least one vGPU identifying the at least one vGPU as located on the first computing device (206). The method 200 includes instantiating, by the runtime component, the process with access to the at least one vGPU (208).

The functionality of the resource manager described in connection with FIG. 2 may be provided by the scheduler component 109.

Referring to FIG. 2 in greater detail, and still in connection with FIGS. 1A, 1B, and 1C, the method 200 includes receiving, by a resource manager, from a runtime component executing on a first computing device, a request for allocation, to a process executing on the first computing device, of access to a GPU in the first computing device (202). One or more processes 105, which may, without limitation, processes such as machine learning or artificial intelligence applications, may request and receive access to one or more vGPUs instead of, or in addition to, receiving access to a physical GPU. Each of the one or more vGPUs are linked dynamically to a physical GPU in a shared GPU pool (e.g., in an EKS cluster on a computing device dedicated to hosting physical GPUs). Disaggregated clusters can dynamically assign GPUs to workloads based on a computational demand of the workload. For instance, a CPU-intensive task can be allocated more CPU resources without unnecessarily tying up GPU resources, and vice versa. In scenarios where a process 105 fails to leverage the full extent of its designated GPU capabilities, the disaggregated system may modify an assignment of a vGPU. Thus, the system described herein may facilitate a seamless oversubscription and subsequent redistribution of GPU assets, enhancing the efficiency of resource utilization and ensuring GPUs' availability is scaled to actual need. Applications may continue to operate under the perception of unshared, locally dedicated GPUs. Meanwhile, all refinements and optimizations occur autonomously within the GPU pool, significantly easing the transition to and acceptance of this architecture.

The method 200 includes allocating, by the resource manager, to the process, access to at least one vGPU associated with a second GPU on a second computing device (204). The resource manager may be the scheduler component 109. The resource manager may transmit, to the runtime component, the identification of the at least one vGPU includes transmitting an identifier providing information for connecting the first computing device to the second computing device.

The method 200 includes transmitting, by the resource manager, to the runtime component, an identification of the at least one vGPU identifying the at least one vGPU as located on the first computing device (206). In some embodiments, in which the process 105 executes in a virtual machine, container, or other sandbox, the runtime component may be a hypervisor.

The method 200 includes instantiating, by the runtime component, the process with access to the at least one vGPU (208).

In some embodiments, the method 200 includes monitoring, by an agent in communication with the resource manager, utilization of the at least one vGPU by the process; identifying, by the agent, a modification to a utilization rate by the process of the at least one vGPU; communicating, by the agent, to the resource manager, the identified modification; allocating, by the resource manager, to the process, a second vGPU associated with a third GPU on the second computing device; and transmitting, by the resource manager, to the runtime component, an identification of the second vGPU identifying the second vGPU as located on the first computing device.

In some embodiments, the method 200 includes determining, by the resource manager, to migrate the vGPU to a third computing device; and transmitting, by the resource manager, to the runtime component, an identification of the vGPU identifying the vGPU as located on the third computing device.

Therefore, the system may achieve a different level of GPU resource utilization by disaggregating the GPUs and bring many other benefits to customers. Benefits may include, without limitation, enhanced scalability. Since CPUs and GPUs are managed as separate resource pools, they can be scaled independently. An organization can add more GPU resources to the cluster without the need for a proportional increase in CPUs, and vice versa. This ensures that investments may be directed precisely where they are needed. Benefits may include, without limitation, optimized resource sharing: disaggregated architectures promote more granular resource allocation, ensuring that teams and projects get precisely the amount of CPU or GPU power they need. This efficient sharing can drastically reduce idle times, leading to higher overall utilization. Benefits may include cost-efficiency: By precisely matching resource allocation to workload needs, organizations can optimize their infrastructure investments. Overprovisioning is minimized, and the total cost of ownership (TCO) is reduced. Benefits may include, without limitation, future-proofing: as the demands of ML/AI workloads evolve, the disaggregated model offers the flexibility to adapt. Whether it's integrating next-generation GPUs or expanding CPU capabilities, the modular nature of disaggregated clusters simplifies upgrades and expansions. Benefits may include workload isolation: disaggregated clusters can isolate GPU-intensive tasks, like deep learning model training, from CPU-bound tasks, such as data preprocessing. This isolation ensures that heavy GPU tasks don't starve other processes of CPU resources, leading to a balanced and smooth multi-tasking environment. In summary, a disaggregated cluster of CPUs and GPUs paves the way for a flexible, scalable, and efficient computational ecosystem. By aligning resource allocation more closely with workload needs, organizations can harness the full potential of their infrastructure investments, ensuring optimal performance and utilization across the board.

Referring again to FIG. 1C, to enable sharing and oversubscription, the system 100 may configure multiple vGPUs to share one physical GPU. This may improve overall utilization while still providing the processes 105 utilizing the vGPU with an illusion of having a dedicated GPU.

Processes 105 that are not actively using GPU resources can be pulled out of the GPUs and have their state saved for future restoration, when they resume utilizing GPUs. This mechanism allows other processes to use the GPU resources, while processes that are not utilizing the GPU remain idle.

To enable improved queuing and scheduling, requests for GPU resources across different groups of processes (e.g., across different departments or groups) may be scheduled in a consolidated cluster based on preferences such as priority, resource availability, and quotes. The scheduler component 109 may maintain one or more queues of processes 105 and take a process 105 from the queue when a vGPU is available.

System administrators may configure per-group priority and quotas based on predetermined preferences (including without limitation, fairness). When a request for a GPU cannot be satisfied, it is put into a priority-based queue. Low priority applications can be preempted and pulled out of GPUs for the execution of higher priority applications.

To provide functionality for merging GPU resources across different physical machines, and as depicted in the following block diagram, one or more GPUs from distinct servers can be virtually consolidated and appear to a single application as if the one or more GPUs were physically on a single server. That is, a computing device 106*n* may execute a second GPU optimization component 140*b* and the scheduler component 109 may communicate with the second GPU optimization component 140*b* to assign access for processes to vGPUs on one or more physical computing devices 106. As a result, processes in a disaggregated architecture that require multiple GPUs need not contend for individual GPU machines that satisfy all resource requirements.

Furthermore, the methods and systems described herein may provide functionality for analyzing usage data across one or more GPUs to identify utilization patterns and improve subsequent executions. For example, by analyzing utilization data from a plurality of vGPUs of one or more physical GPUs on one or more GPU machines, the system 100 may determine points of time in process execution when a process of a particular type is more likely to require additional GPU resources or go into an idle mode or be suspended; the system 100 may apply such a determination in subsequent allocations of vGPUs to processes of a similar type.

In one embodiment, the system 100 includes a resource manager that receives requests (e.g., via an application program interface (API) call from a process) for access to a vGPU. The resource manager may provide the functionality for GPU cluster management and vGPU scheduling depicted in the block diagram above. The resource manager may receive requests for access from a hypervisor instantiating a virtual machine or other process and allocating virtual resources to the instantiated process. The resource manager may receive requests for access directly from an executing process. The resource manager may receive data, such as utilization data, from one or more GPU servers (also referred to herein as GPU machines). The resource manager may transmit the received data to one or more components in the system 100 for analysis and incorporation into subsequent execution of allocation methods.

The methods and systems described herein may therefore provide GPU remoting for processes executing artificial intelligence workloads that benefit from disaggregation of the CPU and the GPU which is not available from conventional systems. As an example, the methods and systems described herein may therefore provide GPU remoting for processes executing machine learning and/or AI workloads, such as, without limitation, processes developed in accordance with the PYTORCH framework, without requiring modification of the process code.

Unlike conventional approaches, such as time slicing which cannot improve utilization if each sharing application cannot fully utilize the whole GPU, the systems and methods described herein allow for sharing portions of the GPU. Furthermore, the systems and methods describe herein do not require fixed partition sizes or interruptions to workloads when changing configurations. Furthermore, conventional approaches do not typically provide a solution for virtualizing graphical processing units when the machines housing the GPUs are stored remotely from the machines executing the processes that need the GPUs (e.g., for cloud-based embodiments). Unlike conventional approaches, the systems and methods described herein fundamentally change the static binding between the GPU processes and the GPU machines and introduce a disaggregated architecture that addresses the bin-packing challenge by allowing dynamic binding between vGPUs and physical GPUs. By way of example, and without limitation, in an embodiment in which ten users have a GPU utilization rate of 30%, by implementing the methods and systems described herein, the system may need to provide only three GPUs instead of ten. As user groups scale up, the system may reduce the number of GPUs needed in the architecture by an even greater amount—for example, in an embodiment with a thousand users and only 30% GPU utilization, implementing the methods and systems described herein results in an architecture having only 300 GPUS, saving 700 GPUs.

In some embodiments, the system 100 includes non-transitory, computer-readable medium comprising computer program instructions tangibly stored on the non-transitory computer-readable medium, wherein the instructions are executable by at least one processor to perform each of the steps described above in connection with FIG. 2.

It should be understood that the systems described above may provide multiple ones of any or each of those components and these components may be provided on either a standalone machine or, in some embodiments, on multiple machines in a distributed system. The phrases 'in one embodiment,' 'in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The terms "A or B", "at least one of A or/and B", "at least one of A and B", "at least one of A or B", or "one or more of A or/and B" used in the various embodiments of the present disclosure include any and all combinations of words enumerated with it. For example, "A or B", "at least one of A and B" or "at least one of A or B" may mean (1) including at least one A, (2) including at least one B, (3) including either A or B, or (4) including both at least one A and at least one B.

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

Although terms such as "optimize" and "optimal" may be used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C #, JAVA, Python, Rust, Go, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

Figure 3A:
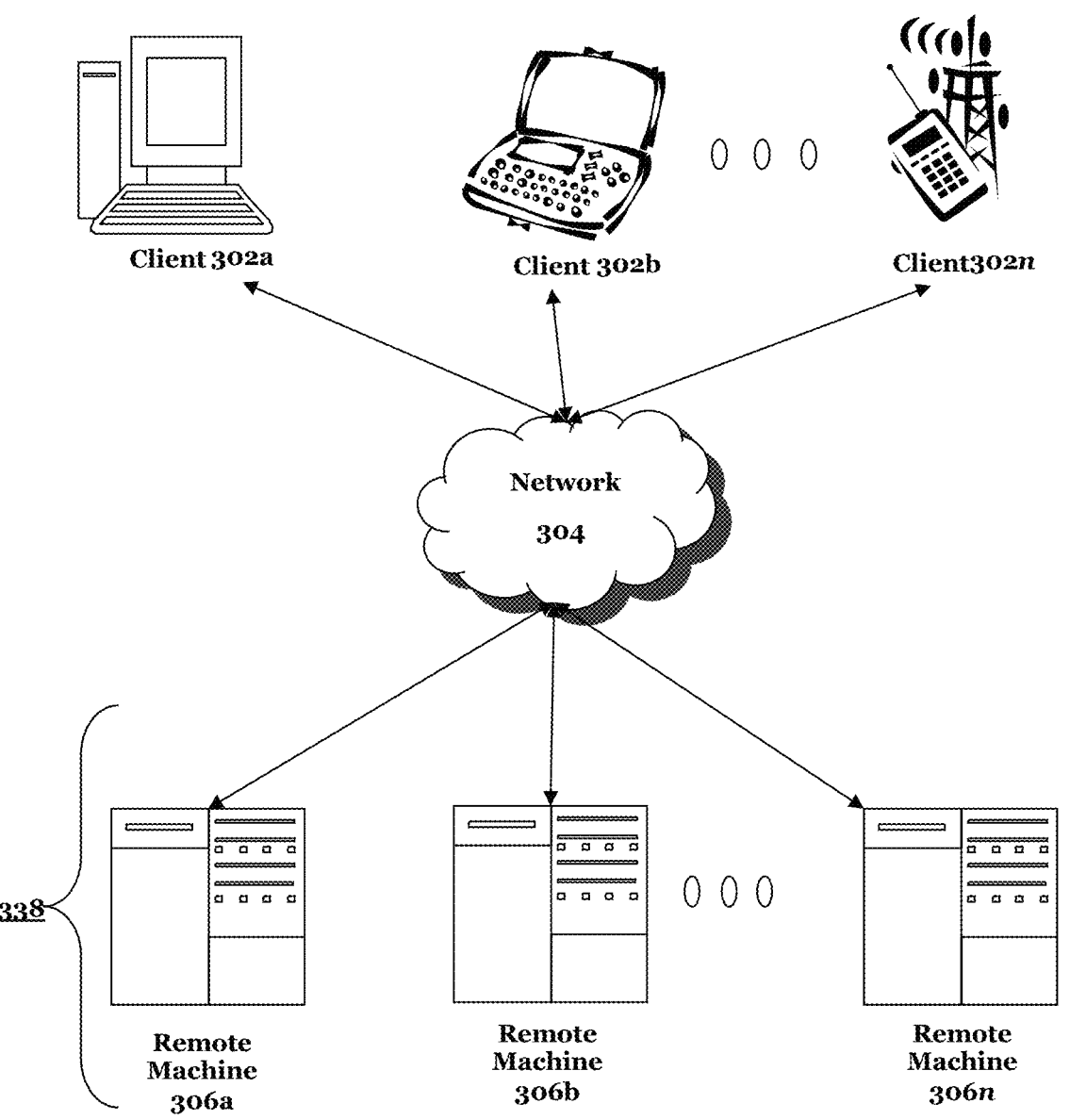
FIGS. 3A-3C are block diagrams depicting embodiments of computers useful in connection with the methods and systems described herein.
Figure 3B:
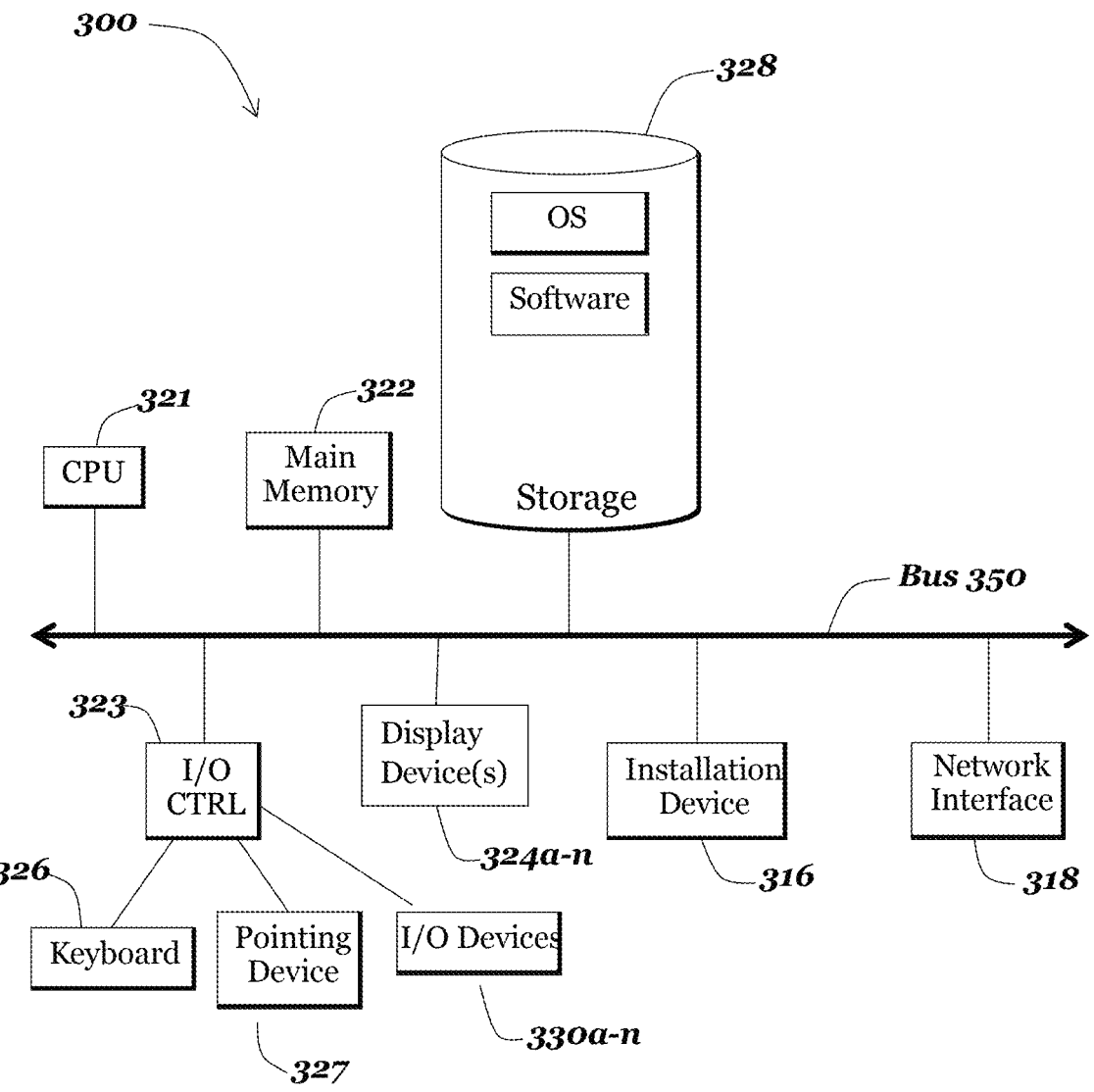
Figure 3C:
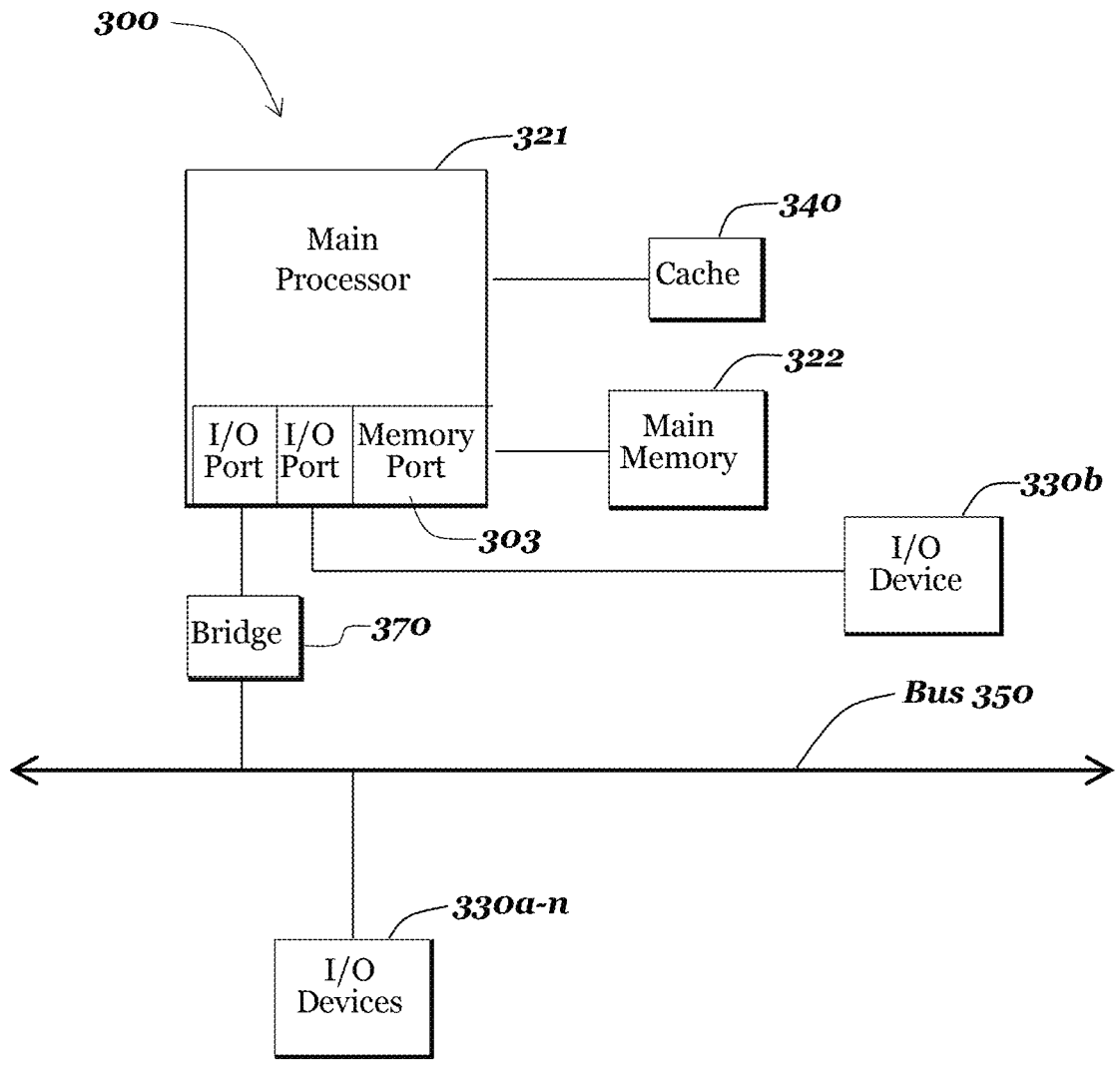

Referring now to FIGS. 3A, 3B, and 3C, block diagrams depict additional detail regarding computing devices that may be modified to execute novel, non-obvious functionality for implementing the methods and systems described above.

Referring now to FIG. 3A, an embodiment of a network environment is depicted. In brief overview, the network environment comprises one or more clients 302a-302n (also generally referred to as local machine(s) 302, client(s) 302, client node(s) 302, client machine(s) 302, client computer(s) 302, client device(s) 302, computing device(s) 302, endpoint(s) 302, or endpoint node(s) 302) in communication with one or more remote machines 306a-306n (also generally referred to as server(s) 306 or computing device(s) 306) via one or more networks 304.

Although FIG. 3A shows a network 304 between the clients 302 and the remote machines 306, the clients 302 and the remote machines 306 may be on the same network 304. The network 304 can be a local area network (LAN), such as a company Intranet, a metropolitan area network (MAN), or a wide area network (WAN), such as the Internet or the World Wide Web. In some embodiments, there are multiple networks 304 between the clients 302 and the remote machines 306. In one of these embodiments, a network 304' (not shown) may be a private network and a network 304 may be a public network. In another of these embodiments, a network 304 may be a private network and a network 304' a public network. In still another embodiment, networks 304 and 304' may both be private networks. In yet another embodiment, networks 304 and 304' may both be public networks.

The network 304 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, a wireline network, an Ethernet, a virtual private network (VPN), a software-defined network (SDN), a network within the cloud such as AWS VPC (Virtual Private Cloud) network or Azure Virtual Network (VNet), and a RDMA (Remote Direct Memory Access) network. In some embodiments, the network 304 may comprise a wireless link, such as an infrared channel or satellite band. The topology of the network 304 may be a bus, star, or ring network topology. The network 304 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 302 and a remote machine 306 (referred to generally as computing devices 300 or as machines 300) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 302 may execute, operate or otherwise provide an application, which can be any type and/or form of software, program, or executable instructions, including, without limitation, any type and/or form of web browser, web-based client, client-server application, an ActiveX control, a JAVA applet, a webserver, a database, an HPC (high performance computing) application, a data processing application, or any other type and/or form of executable instructions capable of executing on client 302.

In one embodiment, a computing device 306 provides functionality of a web server. The web server may be any type of web server, including web servers that are open-source web servers, web servers that execute proprietary software, and cloud-based web servers where a third party hosts the hardware executing the functionality of the web server. In some embodiments, a web server 306 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, WA, the ORACLE IPLANET web server products provided by Oracle Corporation of Redwood Shores, CA, or the ORACLE WEBLOGIC products provided by Oracle Corporation of Redwood Shores, CA.

In some embodiments, the system may include multiple, logically-grouped remote machines 306. In one of these embodiments, the logical group of remote machines may be referred to as a server farm 338. In another of these embodiments, the server farm 338 may be administered as a single entity.

As will be understood by those of skill in the art, in some embodiments, a computing device 300 may provide a virtualization environment. In such embodiments, the computing device 300 may include a hypervisor layer, a virtualization layer, and a hardware layer. The hypervisor layer includes a hypervisor that allocates and manages access to a number of physical resources in the hardware layer (e.g., the processor(s) and disk(s)) by at least one virtual machine executing in the virtualization layer. The virtualization layer includes at least one operating system and a plurality of virtual resources allocated to the at least one operating system. Virtual resources may include, without limitation, a plurality of virtual processors and virtual disks, as well as virtual resources such as virtual memory and virtual network interfaces. The plurality of virtual resources and the operating system may be referred to as a virtual machine. A hypervisor may provide virtual resources to an operating system in any manner that simulates the operating system having access to a physical device. A hypervisor may provide virtual resources to any number of guest operating systems. In some embodiments, a computing device executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, California; the XEN hypervisor, an open source product whose development is overseen by the open source Xen.org community; the KVM hypervisor, an open source product whose development is overseen by the open source Linux community; HyperV, VirtualServer or virtual PC hypervisors provided by Microsoft, Amazon Nitro, Amazon Firecracker, or others. In some embodiments, a computing device executing a hypervisor that creates a virtual machine platform on which guest operating systems may execute is referred to as a host server. In some embodiments, a hypervisor executes within an operating system executing on a computing device. In one of these embodiments, a computing device executing an operating system and a hypervisor may be said to have a host operating system (the operating system executing on the computing device), and a guest operating system (an operating system executing within a computing resource partition provided by the hypervisor). In other embodiments, a hypervisor interacts directly with hardware on a computing device, instead of executing on a host operating system. In one of these embodiments, the hypervisor may be said to be executing on "bare metal," referring to the hardware comprising the computing device. In some embodiments, the hypervisor controls processor scheduling and memory partitioning for a virtual machine executing on the computing device. In one of these embodiments, the hypervisor controls the execution of at least one virtual machine. In another of these embodiments, the hypervisor presents at least one virtual machine with an abstraction of at least one hardware resource provided by the computing device. In other embodiments, the hypervisor controls whether and how physical processor capabilities are presented to the virtual machine. In one embodiment, the guest operating system, in conjunction with the virtual machine on which it executes, forms a fully-virtualized virtual machine which is not aware that it is a virtual machine; such a machine may be referred to as a "Domain U HVM (Hardware Virtual Machine)". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor; in such an embodiment, the driver is typically aware that it executes within a virtualized environment. In another embodiment, the guest operating system, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include.

FIGS. 3B and 3C depict block diagrams of a computing device 400 useful for practicing an embodiment of the client 302 or a remote machine 306. As shown in FIGS. 3B and 3C, each computing device 300 includes a central processing unit 321, and a main memory unit 322. As shown in FIG. 3B, a computing device 300 may include a storage device 328, an installation device 316, a network interface 318, an I/O controller 323, display devices 324a-n, a keyboard 326, a pointing device 327, such as a mouse, and one or more other I/O devices 330a-n. The storage device 328 may include, without limitation, an operating system and software. As shown in FIG. 3C, each computing device 300 may also include additional optional elements, such as a memory port 303, a bridge 370, one or more input/output devices 330a-n (generally referred to using reference numeral 330), and a cache memory 340 in communication with the central processing unit 321.

The central processing unit 321 is any logic circuitry that responds to and processes instructions fetched from the main memory unit 322. In many embodiments, the central processing unit 321 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA. Other examples include RISC-V processors, SPARC processors, ARM processors, processors used to build UNIX/LINUX "white" boxes, and processors for mobile devices. The computing device 300 may be based on any of these processors, or any other processor capable of operating as described herein.

Main memory unit 322 may be one or more memory chips capable of storing data and allowing any storage location to be directly accessed by the microprocessor 321. The main memory 322 may be based on any available memory chips capable of operating as described herein. In the embodiment shown in FIG. 3B, the processor 321 communicates with main memory 322 via a system bus 350. FIG. 3C depicts an embodiment of a computing device 300 in which the processor communicates directly with main memory 322 via a memory port 303. FIG. 3C also depicts an embodiment in which the main processor 321 communicates directly with cache memory 340 via a secondary bus, sometimes referred to as a backside bus. In other embodiments, the main processor 321 communicates with cache memory 340 using the system bus 350.

In the embodiment shown in FIG. 3B, the processor 321 communicates with various I/O devices 330 via a local system bus 350. Various buses may be used to connect the central processing unit 321 to any of the I/O devices 330, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display device 324, the processor 321 may use an Advanced Graphics Port (AGP) to communicate with the display device 324. FIG. 3C depicts an embodiment of a computing device 300 in which the main processor 321 also communicates directly with an I/O device 330b via, for example, HYPERTRANSPORT, RAPI-DIO, or INFINIBAND communications technology.

One or more of a wide variety of I/O devices 330a-n may be present in or connected to the computing device 300, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 323 as shown in FIG. 3B. Furthermore, an I/O device may also provide storage and/or an installation medium 316 for the computing device 300. In some embodiments, the computing device 300 may provide USB connections (not shown) to receive handheld USB storage devices such as the USB Flash Drive line of devices manufactured by Twintech Industry, Inc. of Los Alamitos, CA.

Referring still to FIG. 3B, the computing device 400 may support any suitable installation device 316, such as hardware for receiving and interacting with removable storage; e.g., disk drives of any type, CD drives of any type, DVD drives, tape drives of various formats, USB devices, external hard drives, or any other device suitable for installing software and programs. In some embodiments, the computing device 300 may provide functionality for installing software over a network 304. The computing device 300 may further comprise a storage device, such as one or more hard disk drives or redundant arrays of independent disks, for storing an operating system and other software. Alternatively, the computing device 300 may rely on memory chips for storage instead of hard disks.

Furthermore, the computing device 300 may include a network interface 318 to interface to the network 304 through a variety of connections including, but not limited to, standard telephone lines, LAN or WAN links (e.g., 802.11, T1, T3, 56kb, X.25, SNA, DECNET, RDMA), broadband connections (e.g., ISDN, Frame Relay, ATM, Gigabit Ethernet, Ethernet-over-SONET), wireless connections, virtual private network (VPN) connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 300 communicates with other computing devices 300' via any type and/or form of gateway or tunneling protocol such as GRE, VXLAN, IPIP, SIT, ip6tnl, VTI and VTI6, IP6GRE, FOU, GUE, GENEVE, ERSPAN, Secure Socket Layer (SSL) or Transport Layer Security (TLS). The network interface 318 may comprise a built-in network adapter, network interface card, PCMCIA network card, card bus network adapter, wireless network adapter, USB network adapter, modem, or any other device suitable for interfacing the computing device 300 to any type of network capable of communication and performing the operations described herein.

In further embodiments, an I/O device 330 may be a bridge between the system bus 350 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a Serial Plus bus, a SCI/LAMP bus, a Fibre Channel bus, or a Serial Attached small computer system interface bus.

A computing device 300 of the sort depicted in FIGS. 3B and 3C typically operates under the control of operating systems, which control scheduling of tasks and access to system resources. The computing device 300 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 7, WINDOWS 8, WINDOWS VISTA, WINDOWS 10, and WINDOWS 11 all of which are manufactured by Microsoft Corporation of Redmond, WA; MAC OS manufactured by Apple Inc. of Cupertino, CA; OS/2 manufactured by International Business Machines of Armonk, NY; Red Hat Enterprise Linux, a Linux-variant operating system distributed by Red Hat, Inc., of Raleigh, NC; Ubuntu, a freely-available operating system distributed by Canonical Ltd. of London, England; CentOS, a freely-available operating system distributed by the centos.org community; SUSE Linux, a freely-available operating system distributed by SUSE, or any type and/or form of a Unix operating system, among others.

Having described certain embodiments of methods and systems for dynamically optimizing and modifying allocation of virtual resources to a process executing in a virtual machine, it will be apparent to one of skill in the art that other embodiments incorporating the concepts of the disclosure may be used.

What is claimed is:

1. A method for dynamically optimizing and modifying allocation of at least one disaggregated graphical processing unit (GPU) to at least one process via at least one virtual graphical processing units (vGPU), the method comprising:

receiving, by a resource manager executing on a first computing device, from a runtime component executing on a second computing device, a request for allocation, to a process executing on the second computing device, of access to a first GPU in the second computing device;

allocating, by the resource manager, to the process, access to at least one vGPU associated with a second GPU on a third computing device;

transmitting, by the resource manager, to the runtime component, an identification of the at least one vGPU identifying the at least one vGPU as located on the second computing device; and instantiating, by the runtime component, the process with access to the at least one vGPU.

2. The method of claim 1, wherein transmitting, by the resource manager, to the runtime component, the identification of the at least one vGPU includes transmitting an identifier providing information for connecting the first computing device to the second computing device.

3. The method of claim 1 further comprising:

monitoring, by an agent in communication with the resource manager, utilization of the at least one vGPU by the process;

identifying, by the agent, a modification to a utilization rate by the process of the at least one vGPU;

communicating, by the agent, to the resource manager, the modification;

allocating, by the resource manager, to the process, a second vGPU associated with a third GPU on the third computing device;

and transmitting, by the resource manager, to the runtime component, an identification of the second vGPU identifying the second vGPU as located on the first computing device.

4. The method of claim 1 further comprising:

determining, by the resource manager, to migrate the vGPU to a fourth computing device; and transmitting, by the resource manager, to the runtime component, an identification of the vGPU identifying the vGPU as located on the first computing device.

* * * * *